United States Patent
Stark

(10) Patent No.: US 9,922,570 B2
(45) Date of Patent: Mar. 20, 2018

(54) AIRCRAFT NAVIGATION PERFORMANCE PREDICTION SYSTEM

(71) Applicant: GE Aviation Systems LLC, Grand Rapids, MI (US)

(72) Inventor: Gregory Alan Stark, Wayland, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 38 days.

(21) Appl. No.: 15/045,510

(22) Filed: Feb. 17, 2016

(65) Prior Publication Data

US 2017/0236429 A1 Aug. 17, 2017

(51) Int. Cl.
| | |
|---|---|
| *G08G 5/00* | (2006.01) |
| *G08G 5/02* | (2006.01) |
| *G01C 23/00* | (2006.01) |
| *G01S 1/16* | (2006.01) |
| *G01S 1/18* | (2006.01) |

(Continued)

(52) U.S. Cl.
CPC ......... *G08G 5/0047* (2013.01); *G01C 23/005* (2013.01); *G01S 1/16* (2013.01); *G01S 1/18* (2013.01); *G08G 5/003* (2013.01); *G08G 5/0017* (2013.01); *G08G 5/0021* (2013.01); *G08G 5/0039* (2013.01); *G08G 5/025* (2013.01); *G01C 21/16* (2013.01); *G01C 23/00* (2013.01); *G01S 13/913* (2013.01); *G05D 1/0676* (2013.01)

(58) Field of Classification Search
CPC .. G08G 5/0047; G08G 5/0017; G08G 5/0039; G08G 5/003; G08G 5/0021; G08G 5/025; G05D 1/0676; G01C 23/005; G01S 1/16; G01S 1/18; G01S 13/913
See application file for complete search history.

(56) References Cited

U.S. PATENT DOCUMENTS 5,923,286 A * 7/1999 Divakaruni .......... G01C 21/165
342/357.44
6,643,580 B1 * 11/2003 Naimer ................ G08G 5/0039
701/14

(Continued)

OTHER PUBLICATIONS

RTCA, Incorporated, "Minimum Operational Performance Standards for Required Navigation Performance for Area Navigation," Oct. 28, 2003—202 pgs.

*Primary Examiner* — Dale W Hilgendorf
(74) *Attorney, Agent, or Firm* — GE Global Patent Operation; William S. Munnerlyn

(57) ABSTRACT

Systems and methods for predicting aircraft navigation performance are provided. In one embodiment, a method can include determining that one or more navigational aid measurements are not available to the aircraft. The method can include estimating a future actual navigation performance of the aircraft for a future point in the flight plan. The method can include determining a future required navigation performance associated with the future point in the flight plan. The method can include comparing the future actual navigation performance to the future required navigation performance to determine if the future actual navigation performance satisfies the future required navigation performance. The method can include providing, to an onboard system of the aircraft, information indicative of whether the future actual navigation performance satisfies the future required navigation performance.

18 Claims, 5 Drawing Sheets

(51) Int. Cl.
    *G01S 13/91*     (2006.01)
    *G05D 1/06*     (2006.01)
    *G01C 21/16*     (2006.01)

(56) References Cited

U.S. PATENT DOCUMENTS

| | | | |
|---|---|---|---|
| 6,708,090 B2 * | 3/2004 | Staggs | G01C 23/005 |
| | | | 701/4 |
| 7,693,621 B1 * | 4/2010 | Chamas | G08G 5/025 |
| | | | 701/16 |
| 8,195,347 B2 * | 6/2012 | Boorman | G08G 5/025 |
| | | | 701/16 |
| 8,630,756 B2 * | 1/2014 | Fleiger-Holmes | G05D 1/0676 |
| | | | 701/16 |
| 2012/0041676 A1 * | 2/2012 | Bouniol | G05D 1/0676 |
| | | | 701/472 |
| 2015/0219460 A1 * | 8/2015 | Gmerek | G01S 19/18 |
| | | | 701/468 |

* cited by examiner

AIRCRAFT NAVIGATION PERFORMANCE PREDICTION SYSTEM

FIELD OF THE INVENTION

The present subject matter relates generally to predicting aircraft navigation performance.

BACKGROUND OF THE INVENTION

An aircraft with inertial reference systems can estimate aircraft navigation performance based on Actual Navigation Performance (ANP), which refers to the current navigation performance of the aircraft. The Actual Navigation Performance informs the pilot as to whether the reported position of the aircraft is within the Required Navigation Performance (RNP), the accuracy required for a given block of airspace, leg or a specific procedure.

Actual Navigation Performance can be calculated based on measurements from inertial reference systems. However, over time, the inertial reference systems can exhibit position errors due to integration drift. For instance, inertial navigation can include small errors in the measurement of acceleration and angular velocity. These errors can be integrated into progressively larger errors in velocity, which can be compounded into still greater errors in position. To compensate for these errors, navigation aid measurements can be provided by a navigation system (e.g., Global Positioning System or ground-based radio navigation aids). These measurements can be used to estimate the inertial errors and remove such errors from the calculations made by the inertial reference systems—allowing for more accurate calculations of position, velocity, and Actual Navigation Performance. However, in some circumstances (e.g., when the aircraft is on approach), navigational aid measurements may not be available to correct these inertial errors. As such, predicting aircraft navigation performance can become difficult.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a computer-implemented method of predicting aircraft navigation performance. The method can include determining, by one or more computing devices included in an aircraft, that one or more navigational aid measurements are not available to the aircraft. The method can further include estimating, by the one or more computing devices, a future actual navigation performance associated with the aircraft for a future point in a flight plan. The future actual navigation performance can be based, at least in part, on data indicative of the flight plan associated with the aircraft and one or more parameters associated with the future point in the flight plan. The method can include determining, by the one or more computing devices, a future required navigation performance associated with the future point in the flight plan. The method can further include comparing, by the one or more computing devices, the future actual navigation performance to the future required navigation performance to determine if the future actual navigation performance satisfies the future required navigation performance. The method can include providing, by the one or more computing devices to an onboard system of the aircraft, information indicative of whether the future actual navigation performance satisfies the future required navigation performance.

Another example aspect of the present disclosure is directed to a flight management system for predicting aircraft navigation performance. The system can include one or more processors and one or more memory devices included with an aircraft. The one or more memory devices can store instructions that when executed by the one or more processors cause the one or more processors to perform operations. The operations can include determining that no navigational aid measurements are available to the aircraft. When no navigational aid measurements are available to the aircraft, the operations can further include estimating one or more future actual navigation performances associated with the aircraft. Each of the one or more future actual navigation performances can be based, at least in part, on data indicative of a flight plan associated with the aircraft and one or more parameters associated with a respective future point in the flight plan. The operations can include determining one or more future required navigation performances for each respective future point in the flight plan. The operations can further include comparing the one or more future actual navigation performances to the one or more future required navigation performances to determine if the future actual navigation performances satisfy the future required navigation performances at the respective future points in the flight plan. The operations can include providing, to an onboard system of the aircraft, information indicative of whether one or more of the future actual navigation performances satisfy one or more of the future required navigation performances.

Yet another example aspect of the present disclosure is directed to an aircraft. The aircraft can include one or more navigation systems configured to provide one or more navigational aid measurements to the aircraft. The aircraft can include one or more onboard systems configured to provide information to a flight crew member of the aircraft. The aircraft can further include a computing system including one or more processors and one or more memory devices located on the aircraft. The one or more memory devices can store instructions that when executed by the one or more processors cause the one or more processors to perform operations. The operations can include determining that the one or more navigational aid measurements are not available to the aircraft. The operations can further include estimating a future actual navigation performance associated with the aircraft. The future actual navigation performance can be based, at least in part, on data indicative of a flight plan associated with the aircraft and one or more parameters associated with a future point in the flight plan. The operations can include determining a future required navigation performance associated with the future point in the flight plan. The operations can include comparing the future actual navigation performance to the future required navigation performance to determine if the future actual navigation performance satisfies the future required navigation performance. The operations can further include providing, to one or more of the onboard systems of the aircraft, data indicating that the aircraft can complete one or more future legs or procedures of the flight plan without exceeding the future required navigation performance when the future actual navigation performance satisfies the future required navigation performance. The operations can include providing, to one or more of the onboard systems of the aircraft, a set of data associated with the future actual navigation performance when the future actual navigation performance does not satisfy the future required navigation performance.

Other example aspects of the present disclosure are directed to systems, methods, aircrafts, avionics systems, devices, non-transitory computer-readable media for predicting aircraft navigation performance.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
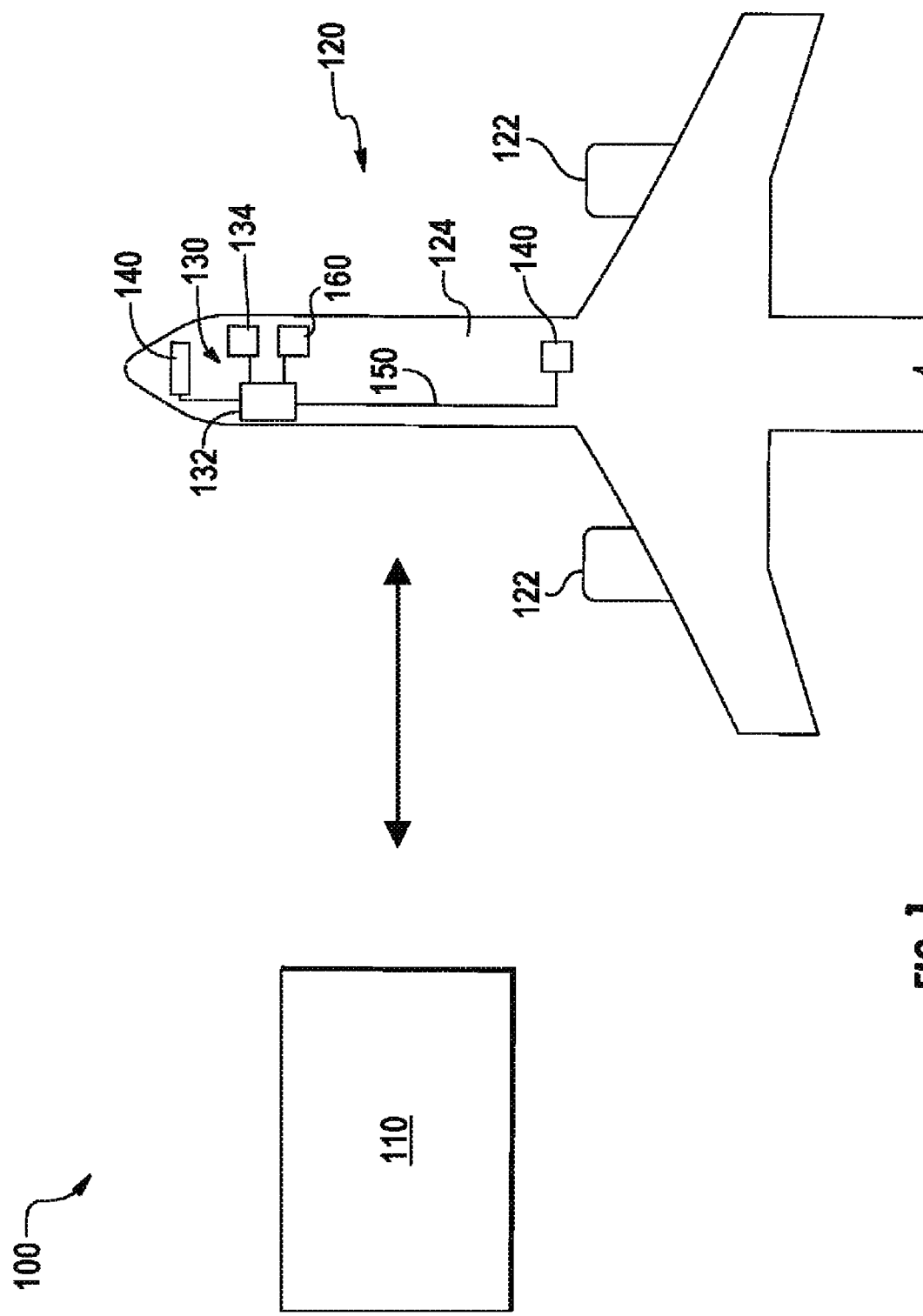
FIG. 1 depicts an example system for predicting aircraft navigation performance according to example embodiments of the present disclosure.

Reference now will be made in detail to embodiments of the invention, one or more example(s) of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for predicting aircraft navigation performance. For instance, a flight management system can predict aircraft navigation performance, without the use of navigational aid measurements (e.g., a measurement associated with a global positioning system, a measurement associated with distance measuring equipment), to determine if the aircraft can complete its flight plan. The flight management system can determine that navigational aid measurements are not available to the aircraft. After which, the flight management system can determine a future actual navigation performance (e.g., an estimate of radial position error) and a future required navigation performance (e.g., an error limit) at one or more future point(s) in the flight plan. The flight management system can compare the future actual navigation performance and the future required navigation performance, to determine if the future actual navigation performance satisfies the future required navigation performance at one or more future point(s) in the flight plan. This can indicate whether the aircraft will ultimately remain on its designated flight path using the current navigation mode.

The flight management system can provide information to an onboard system of the aircraft (e.g., flight deck display device, alert system) indicating whether the future actual navigation performance satisfies the future required navigation performance (e.g., the future actual navigation performance is within the error limit set forth by the future required navigation performance). The onboard system can, in turn, inform the flight crew if and when the aircraft may exceed the future required navigation performance or whether the aircraft can complete its flight plan without exceeding the future required navigation performance under its current navigation mode. If the future required navigation performance is to be exceeded, the flight crew can adjust the conditions (e.g., velocity, altitude, position) and/or the navigation mode of the aircraft accordingly, or when the future required navigation performance is to be exceeded on approach, the flight crew may choose an alternate approach procedure.

More particularly, the flight management system of an aircraft can determine that one or more navigational aid measurement(s) are not available to the aircraft. This can arise, for example, from a lack of communicability between the flight management system and one or more navigation system(s) that provide such measurements (e.g., while traveling in a remote area). In such a case, the flight management system can enter into a "coast" mode, whereby it must estimate the position, altitude, velocity, etc. of the aircraft (and ultimately the future actual navigation performance) without the assistance of navigational aid measurement(s).

The flight management system can determine one or more future actual navigation performance(s) associated with the aircraft. A future actual navigation performance can be an actual navigation performance value of the aircraft at a future point in time. For example, the future actual navigation performance can include an estimate of the aircraft radial position error.

Each of the one or more future actual navigation performance(s) can be based, at least in part, on data indicative of a flight plan associated with the aircraft and/or one or more parameter(s) associated with a future point in the flight plan. The data indicative of the flight plan can include, for example, route data associated with a flight plan. The one or more parameter(s) can include, for example, an estimated speed, position, velocity, altitude, etc. associated with the aircraft at a future point in the flight plan.

The flight management system can determine one or more future required navigation performance(s) for each respective future point in the flight plan. The future required navigation performance(s) can be a required navigation performance value at a future point in the flight plan. This can be, for example, set by aviation authorities for a flight plan leg, procedure, and/or navigation environment. The future required navigation performance(s) can include, for example, a limit of error, such as a limit of aircraft position error.

In some implementations, the flight management system can determine the future required navigation performance by obtaining it from a navigational database associated with the flight management system. The navigational database can include the required navigation performance(s) as set by the aviation authorities.

In other implementations, the flight management system can determine the future required navigation performance(s). For example, the flight management system can determine the future required navigation performance based, at least in part, on the navigation environment, as further described herein.

The flight management system can compare the one or more future actual navigation performance(s) to the future required navigation performance(s). The flight management system can determine if the future actual navigation performance(s) satisfy the future required navigation performance(s) at the respective future points in the flight plan. For example, for a future point in the flight plan of the aircraft, the flight management system can compare a 95% estimate of radial position error of the aircraft to an error limit.

The flight management system can provide, to one or more onboard system(s) of the aircraft, information indicative of whether the future actual navigation performance(s) satisfy the future required navigation performance(s). For example, the flight management system can determine that the future actual navigation performance satisfies the future required navigation performance at a respective future point in the flight plan. Accordingly, the flight management system can provide, to one or more onboard system(s) of the aircraft, data indicating that the aircraft can complete one or more future leg(s) and/or procedure(s) (i.e. an approach procedure) of the flight plan without exceeding (e.g., remaining less than) the future required navigation performance.

The onboard system(s) can, in turn, inform the flight crew that the future leg(s) and/or procedure(s) can be completed without exceeding the future required navigation performance. In one example, the onboard system(s) (e.g., flight deck display device, alert system) can provide an audible and/or visual annunciation to a flight crew member indicating as such.

However, the flight management system can determine that the future actual navigation performance does not satisfy the future required navigation performance at a future point in the flight plan. In such a case, the flight management system can, for instance, provide a set of data associated with the future actual navigation performance, to one or more onboard system(s) of the aircraft. The set of data can include, for example, a message indicating that the future actual navigation performance exceeds the future required navigation performance at a future point in the flight plan, an amount of time remaining until the future required navigation performance will be exceeded, a future time at which the future required navigation performance will be exceeded, a future actual navigation performance at the future time, and/or other data associated with the future actual navigation performance. The onboard system(s) can inform the flight crew that the future actual navigation performance does not satisfy the future required navigation performance at a future point in time by providing an audio and/or visual annunciation, activating an alert, etc.

The systems and methods according to example aspects of the present disclosure can predict aircraft performance without the use of navigational aid measurements. More particularly, the systems and methods can compensate for inertial errors without reliance on navigation systems. In this way, the systems and methods according to example aspects of the present disclosure have a technical effect of predicting whether the current navigation mode of the aircraft will preclude completion of a planned procedure or fail to satisfy required navigation performances at any point downstream in the flight plan, increasing aircraft autonomy and safety.

FIG. 1 depicts an example system 100 for predicting aircraft navigation performance according to example embodiments of the present disclosure. As shown, the system 100 can include one or more navigation system(s) 110 and aircraft 120. In some implementations, the navigation system(s) 110 and aircraft 120 can be configured to communicate between one another via one or more communications network(s).

The navigation system(s) 110 can include, for example, a global positioning system (GPS), distance measuring equipment (DME), a VHF Omni-Directional Range (VOR) system, a localizer system, and/or any other navigation system suitable for use with the aircraft 120. One or more component(s) of the navigation system(s) 110 (e.g., receiver, display, other onboard components) can be included with aircraft 120 and/or one or more component(s) of the navigation system(s) 110 (e.g., satellite) can be remote from the aircraft 120.

The navigation system(s) 110 can be configured to provide navigational aid measurements to the aircraft 120. The navigational aid measurements can include, for example, a measurement associated with a global positioning system (GPS), a measurement associated with distance measuring equipment (DME), a measurement associated with a VHF Omni-Directional Range (VOR) system, a measurement associated with a localizer system and/or any other navigational aid measurements. The aircraft 120 can be configured to use these navigational aid measurements, for example, to compensate for inertial navigation errors.

The aircraft 120 can include one or more engine(s) 122, a fuselage 124, and a flight management system 130. In some implementations, the engine(s) 122 can be configured as a gas turbine engine. For example, the engine(s) 122 can include a compressor section, a combustion section, and a turbine section in serial flow order. The engine(s) 122 can be configured as a turbofan engine, a turbojet engine, a turboprop engine, a turboshaft engine, etc. In other implementations, the engine(s) 122 can be an internal combustion engine, or any other suitable engine for use in an aircraft.

The flight management system 130 can include one or more computing device(s) 132 and/or one or more inertial reference system(s) 134 that can be associated with, for instance, an avionics system. The computing device(s) 132 and/or inertial reference system(s) 134 can be included with the aircraft 120, and can be configured to communicate with one another. The inertial reference system(s) 134 can exist as part of the flight management system 130 or can exist separately from the flight management system 130, whereby the flight management system 130 and the inertial reference system(s) 134 can be configured to communicate with one another.

The computing device(s) 132 can include one or more function(s) associated with flight management. For instance, the computing device(s) 132 can include a flight plan function and/or a predictions function. The flight plan function can include information about a flight plan associated with the aircraft 120. For example, the flight plan function can include information associated with an intended route of the aircraft 120 set forth in the flight plan and/or various waypoints along the intended route of the flight plan. The predictions function can be configured to estimate one or more parameter(s) associated with the aircraft 120 at future points in the flight plan. For example, at each future point and/or time in the flight plan, the predictions function can be configured to estimate, an estimated speed associated with the aircraft 120, an estimated position associated with the aircraft 120, an estimated velocity associated with the aircraft 120, an estimated altitude associated with the aircraft 120, and/or other parameters associated with the aircraft 120.

The computing device(s) 132 can be coupled to a variety of onboard systems 140 included with the aircraft 120 over a network 150. The network 150 can include a data bus or combination of wired and/or wireless communication links. The computing device(s) 132 can be configured to communicate with one or more onboard system(s) 140 associated with the aircraft 120. In some implementations, the onboard system(s) 140 can be configured to perform various aircraft operations and control and/or monitor various settings and parameters associated with the aircraft 120. For instance, the onboard system(s) 140 can be associated with a flight deck system, a display system, an alert system, an audio system, a video system, a communications system, a flight recorder, monitoring systems, and/or other systems of the aircraft 120.

The inertial reference system(s) 134 can be configured to provide inertial navigation to the aircraft 120. For instance, the inertial reference system(s) 134 can include one or more computing device(s) and one or more sensor(s), such as a motion sensor, an accelerometer, a rotation sensor, a gyroscope, and/or other suitable sensors. The inertial reference system(s) 134 can be configured to calculate one or more condition(s) (e.g., position, orientation, velocity) of the aircraft 120. For example, the sensors of the inertial reference system(s) 134 can be configured to track the position and orientation of the aircraft 120 relative to a known starting point, orientation, and/or velocity and provide such information to the computing device(s) of the inertial reference system(s) 134. The inertial reference system(s) 134 can process these signals and determine position, orientation, and/or velocity measurements of the aircraft 120. The inertial reference system(s) 134 can be configured to communicate such measurements to the computing device(s) 132.

The computing device(s) 132 can include one or more function(s), equation(s), algorithm(s), etc. for correcting errors associated with the inertial reference system(s) 134. For example, the computing device(s) 132 can include one or more algorithms (e.g., Kalman filter, other algorithm to model system state) for each of the inertial reference system(s) 134. The computing device(s) 132 can use the navigational aid measurements (e.g., in the algorithms) to estimate the errors associated with the inertial reference system(s) 134 and correct the inertial position, orientation, and velocity.

The computing device(s) 132 can be configured to determine that one or more navigational aid measurement(s) are not available to the aircraft 120. This can arise, for example, from a lack of communicability between the flight management system 130 and the navigation system(s) 110 (e.g., while traveling in a remote area). In such a case, flight management system 130 can enter into a "coast" mode, whereby it can estimate the speed, position, altitude, velocity, etc. of the aircraft 120 (and ultimately the future actual navigation performance) without the assistance of navigational aid measurement(s).

The computing device(s) 132 can be configured to determine one or more future actual navigation performance(s) associated with the aircraft 120. The future actual navigation performance can be a future actual navigation performance value, which can include a value associated with the actual navigation performance of the aircraft 120 at a future point in time (e.g., in nautical miles). In some implementations, the future actual navigation performance can include an aircraft position error. For example, the future actual navigation performance can consist of a 95% estimate of the position estimation error of the position computed by the flight management system 130.

Each of the one or more future actual navigation performance(s) can be based, at least in part, on data indicative of a flight plan associated with the aircraft 120 and/or one or more parameter(s) associated with a future point in the flight plan. The data indicative of a flight plan can include, for example, route data associated with a flight plan and can be provided by the flight plan function. As indicated above, the one or more parameter(s) can include, at least one of, an estimated speed associated with the aircraft 120, an estimated position associated with the aircraft 120, an estimated velocity associated with the aircraft 120, and/or an estimated altitude associated with the aircraft 120. The one or more parameter(s) can be provided by the predictions function.

The computing device(s) 132 can be configured to determine one or more future required navigation performance(s) for each respective future point in the flight plan. The required navigation performance(s) can include a required navigation performance value, such as a value associated with a required navigation performance at a future point in the flight plan of the aircraft 120 (e.g., in nautical miles). This can be, for example, set by aviation authorities for a flight plan leg, procedure, and/or navigation environment. In some implementations, the required navigation performance(s) can include a limit of error, such as a limit of aircraft position error. By way of example, the computing device(s) 132 can be configured to determine the future required navigation performance(s) by obtaining them from a navigational database 160. The navigational database 160 can include the required navigation performance(s) set by aviation authorities.

The computing device(s) 132 can be configured to compare the one or more future actual navigation performance(s) to the future required navigation performance(s). The computing device(s) 132 can be configured to determine if the future actual navigation performance(s) satisfy the future required navigation performance(s) at each respective future point in the flight plan, as further described herein. For example, for a future point in the flight plan of the aircraft 120, the computing device(s) 132 can be configured to compare a future estimated positional error to a future error limit at that point.

The computing device(s) 132 can be configured to provide, to the one or more onboard system(s) 140, information indicative of whether one or more of the future actual navigation performance(s) satisfy one or more of the future required navigation performance(s). For example, the future actual navigation performance(s) can satisfy one or more of the future required navigation performance(s) at the one or more respective future point(s) in the flight plan. In such a case, the computing device(s) 132 can provide, to one or more onboard system(s) 140 of the aircraft 120, data indicating that the aircraft 120 can complete one or more future leg(s) and/or procedure(s) of the flight plan without exceeding the one or more future required navigation performance(s). The onboard system(s) 140 can be configured to inform the flight crew that the future leg(s) and/or procedure(s) can be completed without exceeding the future required navigation performance(s). In one example, a flight deck display device and/or an aircraft alert system can be configured to provide an annunciation (e.g., textual, graphical, visual, audio, video) to a flight crew member indicating as such.

However, when one or more of the future actual navigation performance(s) do not satisfy one or more of the future required navigation performance(s) at one or more of the respective future point(s) in the flight plan, the computing device(s) 132 can, for instance, provide a set of data associated with the future actual navigation performance(s), to one or more onboard system(s) 140 of the aircraft 120. The set of data associated with the one or more future actual navigation performance(s) can include, for example, at least one of a message indicating that one or more of the future actual navigation performance(s) exceed (e.g., are not less than) one or more of the future required navigation performance(s), an amount of time remaining until one or more of the future required navigation performance(s) will be exceeded, one or more future time(s) at which one or more of the future required navigation performance(s) will be exceeded, one or more future actual navigation performance(s) at the one or more future time(s), and/or other data associated with the future actual navigation performance(s).

The onboard system(s) 140 can be configured to inform the flight crew that the future actual navigation performance(s) do not satisfy one or more of the future required navigation performance(s) by providing an annunciation (e.g., textual, graphical, visual, audio, video), activating an alert, etc.

Figure 2:
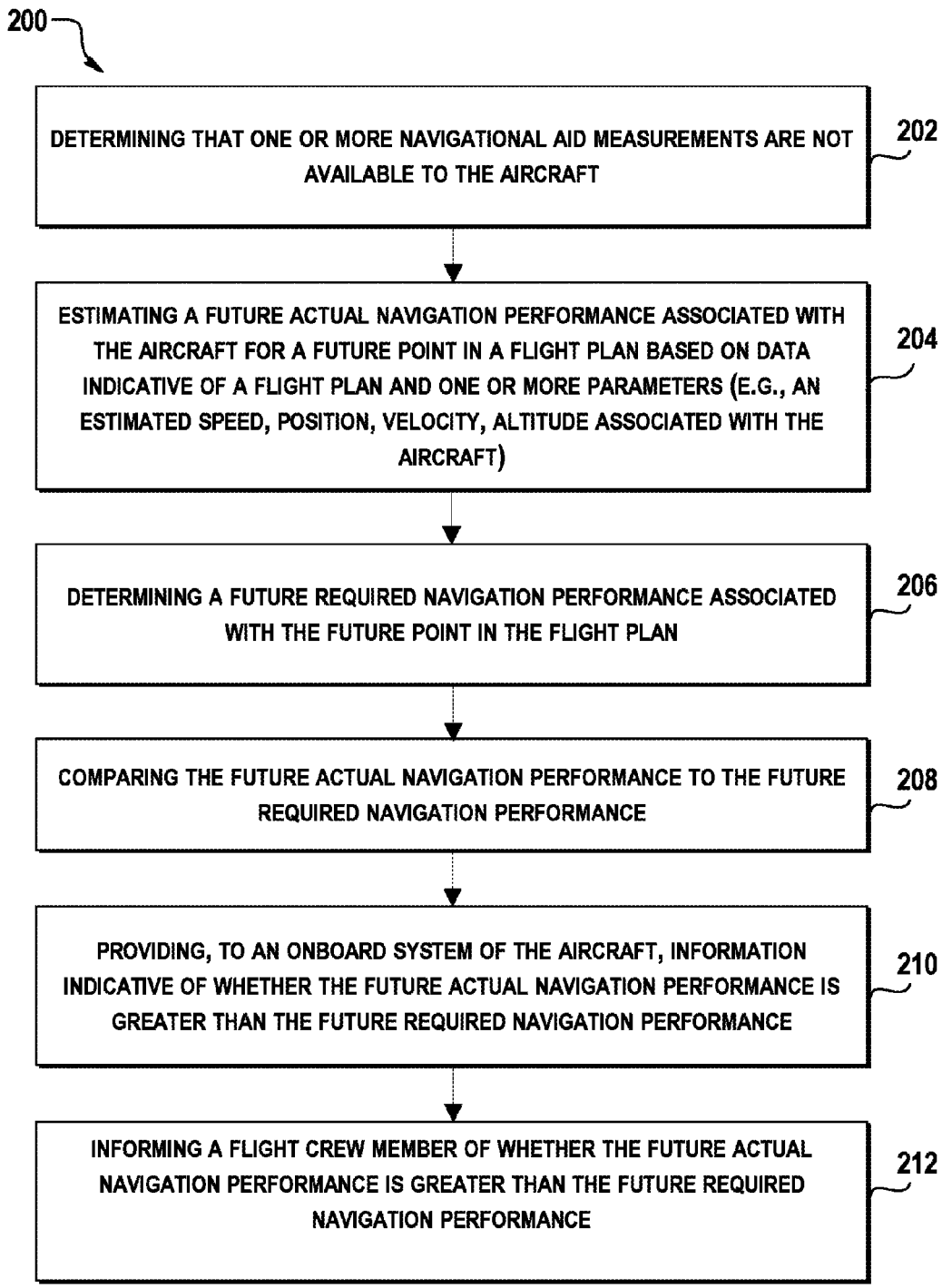
FIG. 2 depicts an example method of predicting aircraft navigation performance according to example embodiments of the present disclosure.

FIG. 2 depicts a flow diagram of an example method 200 of predicting aircraft navigation performance according to example embodiments of the present disclosure. FIG. 2 can be implemented by one or more computing device(s), such as the computing device(s) 132 depicted in FIGS. 1 and 3. The step(s) of the method 200 can be performed while aircraft 120 is in-flight and one or more of the step(s) of the method 200 can be performed without navigational aid measurement(s). For instance, one or more of the step(s) can be performed when one or more navigational aid measurement(s) are not available to the aircraft and/or when no navigational aid measurement(s) are available. In addition, FIG. 2 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (202), the method 200 can include determining that one or more navigational aid measurement(s) are not available to the aircraft 120. For instance, the computing device(s) 132 can determine that one or more navigational aid measurement(s) are not available to the aircraft 120. For example, in the event that the aircraft 120 is traveling in a remote area, the communicability between the navigation system(s) 110 and the aircraft 120 may be limited. Computing devices 132 can determine that no navigational aid measurement(s) are available to the aircraft 120 and, thus, not available to compute aircraft actual navigation performance. Accordingly, the computing device(s) 132 can determine that flight management system 130 is to operate in a coast mode.

At (204), the method 200 can include estimating a future actual navigation performance associated with the aircraft 120 for a future point in a flight plan based on data indicative of a flight plan and one or more parameters. For instance, the computing device(s) 132 can estimate a future actual navigation performance associated with the aircraft 120 for a future point in the flight plan, without navigational aid measurement(s). The future actual navigation performance can be based, at least in part, on data indicative of a flight plan associated with the aircraft 120 and one or more parameter(s) associated with the future point in the flight plan. The data indicative of the flight plan can include coordinate information associated with an intended flight route. The parameter(s) can include, for example, an estimated speed associated with the aircraft 120, an estimated position associated with the aircraft 120, an estimated velocity associated with the aircraft 120, and/or an estimated altitude associated with the aircraft 120 at the future point in the flight plan. As indicated above, these parameter(s) can be provided by the predictions function of the computing device(s) 132.

In some implementations, to determine the future actual navigation performance, the computing device(s) 132 can first determine a current position error covariance matrix associated with the aircraft 120 at the time when the navigational aid measurement(s) become unavailable. For example, the initial value can be represented by $\overline{P}_0 = \overline{P}_{KF}$. The computing devices(s) 132 can use one or more algorithms(s) (e.g., Kalman filters) to propagate the position error covariance faster than real-time, at future points in time. For example, the computing device(s) 132 can propagate the position error covariance at future points in the flight plan associated with aircraft 120. In some implementations, this can be represented by $\overline{P}_{t+x} = \overline{\Phi}_t \overline{P}_t \overline{\Phi}_t^T + \overline{Q}_t$, where "$\overline{\Phi}_t$" is the system model, "$\overline{Q}_t$" is a matrix that represents the uncertainty in the system model (e.g., the process noise matrix), and x is the time step. Inputs to the system model can include, for example, the one or more parameter(s) from the predictions function.

The computing device(s) 132 can determine a solution for each of its one or more algorithm(s) and statistically blend the solutions to form a single covariance matrix for the position error estimates of the aircraft 120. The computing device(s) 132 can then estimate the future actual navigation performance at a future point in the flight plan based, at least in part, on the covariance matrix and the position error estimates.

At (206), the method 200 can include determining a future required navigation performance associated with the future point in the flight plan. For instance, the computing device(s) 132 can determine a future required navigation performance associated with the future point in the flight plan of the aircraft 120. The future required navigation performance can include a limit of error associated with a future point, leg, procedure, etc. of the flight plan.

In one example, the computing device(s) 132 can obtain the future required navigation performance(s) from a navigational database 160. As indicated above, the navigational database 160 can include the required navigation performance(s) set by aviation authorities.

In another example, the computing device(s) 132 can compute the future required navigation performance. For instance, the computing device(s) 132 can determine the future required navigation performance based, at least in part, on the parameters associated with the aircraft 120 at future points in the flight plan (e.g., position, altitude) and/or the navigation environment (e.g., enroute, oceanic, terminal, approach). In another example, a flight crew member (e.g., pilot) can set the future required navigation performance and provide the future required navigation performance to the flight management system 130 via an onboard system 140 (e.g., flight deck system) that includes an input device (e.g., keyboard, touchscreen).

At (208), the method 200 can include comparing the future actual navigation performance to the future required navigation performance. For instance, the computing device(s) 132 can compare the future actual navigation performance to the future required navigation performance to determine if the future actual navigation performance satisfies the future required navigation performance.

By way of example, the future actual navigation performance can include an estimate of the aircraft radial position error value associated with the aircraft 120 and the future required navigation performance can include a limit of radial position error. If the future actual navigation performance does not satisfy the future required navigation performance, the flight management system 130 and/or a flight crew member may need to adjust one or more condition(s) and/or navigation mode(s) of aircraft 120 to complete the future legs and/or procedures of the flight plan and/or choose an alternate procedure(s). However, if the future actual navigation performance satisfies the future required navigation performance, the aircraft 120 can complete the future legs and procedures of the flight plan without adjustment.

At (210), the method 200 can include providing, to an onboard system 140 of the aircraft 120, information indicative of whether the future actual navigation performance satisfies the future required navigation performance. For instance, the future actual navigation performance can be an estimate of an aircraft radial position error in nautical miles, while the future required navigation performance can be an acceptable limit of aircraft radial position error, also expressed in nautical miles. The computing device(s) 132 can provide, to the onboard system(s) 140 of the aircraft 120, information indicative of whether the future actual navigation performance satisfies the future required navigation performance.

Figure 3:
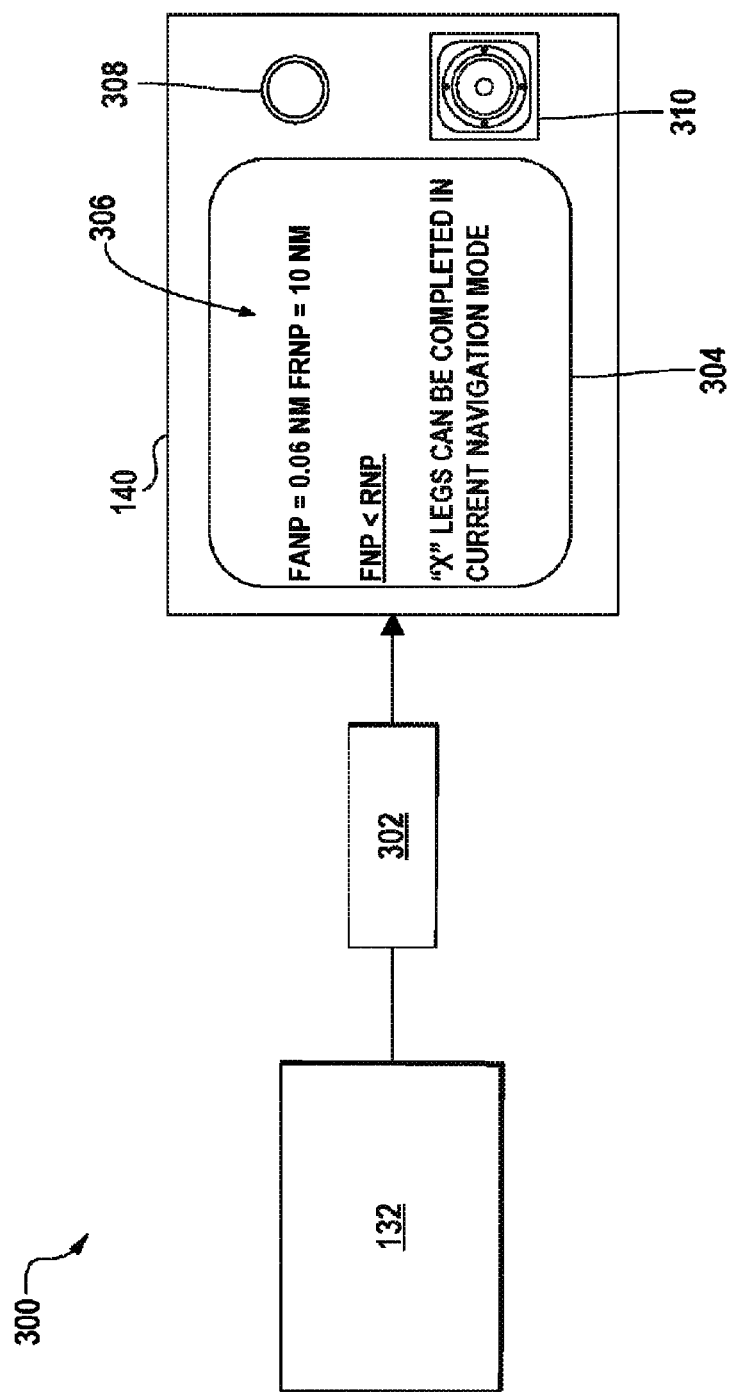
FIG. 3 depicts an example system according to example embodiments of the present disclosure.

FIG. 3 illustrates an example implementation when the future actual navigation performance satisfies the future required navigation performance. For example, as shown in system 300 of FIG. 3, the future required navigation performance can be 10 nautical miles, which can indicate that the aircraft 120 must be able to calculate its position within a circle with a radius of 10 nautical miles while at that future point and/or leg in the flight plan. The future actual navigation performance can be 0.06 nautical miles, which can indicate that the aircraft 120 can calculate its position within a circle with a radius of 0.06 nautical miles while at that future point and/or leg in the flight plan. Thus, in FIG. 3, the future actual navigation performance satisfies the future required navigation performance because the aircraft 120 can calculate its position within 0.06 nautical miles, which is within the 10 nautical mile limit. Accordingly, the future actual navigation performance (e.g., its nautical mile value) does not exceed (e.g., is less than or equal to) the future required navigation performance (e.g., its nautical mile limit). Said differently, the future actual navigation performance is within the limit set forth by the future required navigation performance. When the future actual navigation performance satisfies the future required navigation performance, the computing device(s) 132 can provide data 302 indicating that the aircraft 120 can complete one or more leg(s) of the flight plan without exceeding the future required navigation performance to one or more of the onboard system(s) 140 of the aircraft 120.

Figure 4:
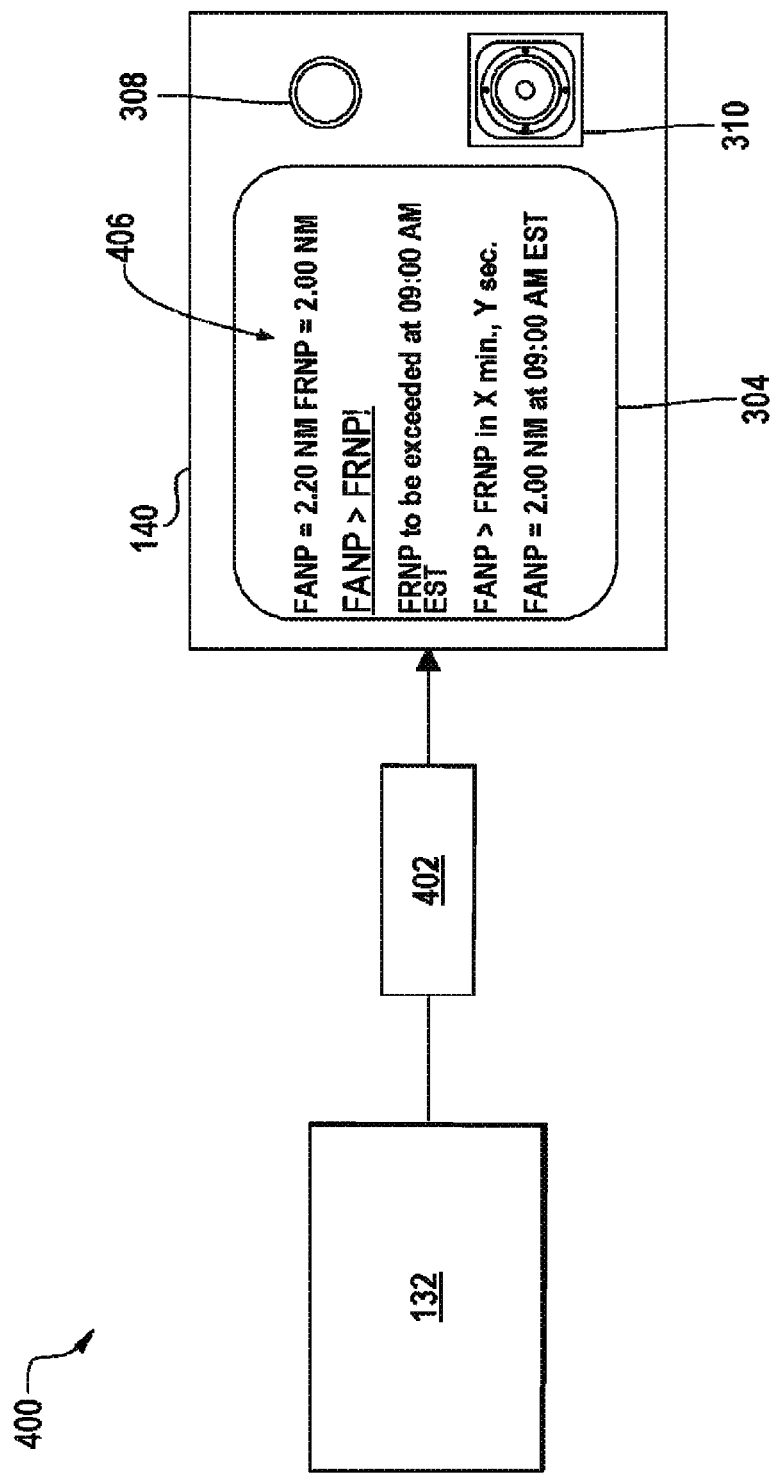
FIG. 4 depicts an example system according to example embodiments of the present disclosure.

In another example, FIG. 4 illustrates an example implementation when the future actual navigation performance does not satisfy the future required navigation performance. As shown in system 400 of FIG. 4, the future required navigation performance can be 2.00 nautical miles, which can indicate that the aircraft 120 must be able to calculate its position to within a circle with a radius of 2.00 nautical miles while at that future point and/or leg in the flight plan. The future actual navigation performance can be 2.20 nautical miles, which can indicate that the aircraft 120 can only calculate its position within a circle with a radius of 2.20 nautical miles at that future point and/or leg in the flight plan. Thus, in FIG. 4, the future actual navigation performance does not satisfy the future required navigation performance because aircraft 120 can only calculate its position within 2.20 nautical miles, which is outside the 2.00 nautical mile limit. Accordingly, the future actual navigation performance (e.g., its nautical mile value) exceeds (e.g., is not less than or equal to) the future required navigation performance (e.g., its nautical mile limit). Said differently, the future actual navigation performance is not within the limit set forth by the future required navigation performance. When the future actual navigation performance does not satisfy the future required navigation performance, the computing device(s) 132 can provide a set of data 402 associated with the future actual navigation performance to one or more of the onboard system(s) 140 of the aircraft 120. For example, the set of data 402 associated with the future actual navigation performance can include, at least one of, a message indicating that the future actual navigation performance exceeds the future required navigation performance, an amount of time remaining until the future required navigation performance will be exceeded, a future time at which the future required navigation performance will be exceeded, and/or the future actual navigation performance at the future time.

Returning to FIG. 2, at (212), the method 200 can include informing a flight crew member of whether the future actual navigation performance satisfies the future required navigation performance. The onboard system(s) 140 can inform a flight crew member as to whether the future actual navigation performance satisfies the future required navigation performance.

For example, as shown in FIG. 3, the onboard system(s) 140 can include a display device 304 (e.g., in a flight deck system) that can display information 306 to inform a flight crew member that future legs and procedures can be completed within the required navigation performance in the current navigation mode. In another example, the onboard system(s) 140 can include one or more light(s) 308 that can indicate whether future legs and procedures can be completed within the required navigation performance. For instance, illumination of light(s) 308 can indicate that future actual navigation performance satisfies future required navigation performance. Additionally, and/or alternatively, onboard system(s) 140 can include an alert system 310 that can audibly inform a flight crew member that future legs and/or procedures of the flight plan can be completed within the required navigation performance.

When the future actual navigation performance does not satisfy the future required navigation performance at one or more future point(s) in the flight plan, the onboard systems(s) 140 can inform a flight crew member. For example, as shown in FIG. 4, the display device 304 can display information 406 for a flight crew member. The information 406 can include an alerting message indicating that the future actual navigation performance exceeds the future required navigation performance, a future time at which the future required navigation performance will be exceeded, an amount of time remaining until the future required navigation performance will be exceeded, and/or the future actual navigation performance at the future time. Additionally, and/or alternatively, the onboard system(s) 140 can inform the flight crew of such information via the light(s) 308 (e.g., non-illuminated light(s), red light) and/or the alerts system 310 (e.g., audibly). A flight crew member can use such information in an attempt to adjust one or more condition(s) and/or the navigation mode of the aircraft 120 to meet the flight plan within the future required navigation performance.

Additionally, and/or alternatively, in some implementations, the flight management system 130 can use the data 402 associated with the future actual navigation performance to automatically adjust conditions and/or the navigation mode associated with the aircraft 120 to complete the flight plan without exceeding future required navigation performance, or the flight crew can choose different procedure(s).

Figure 5:
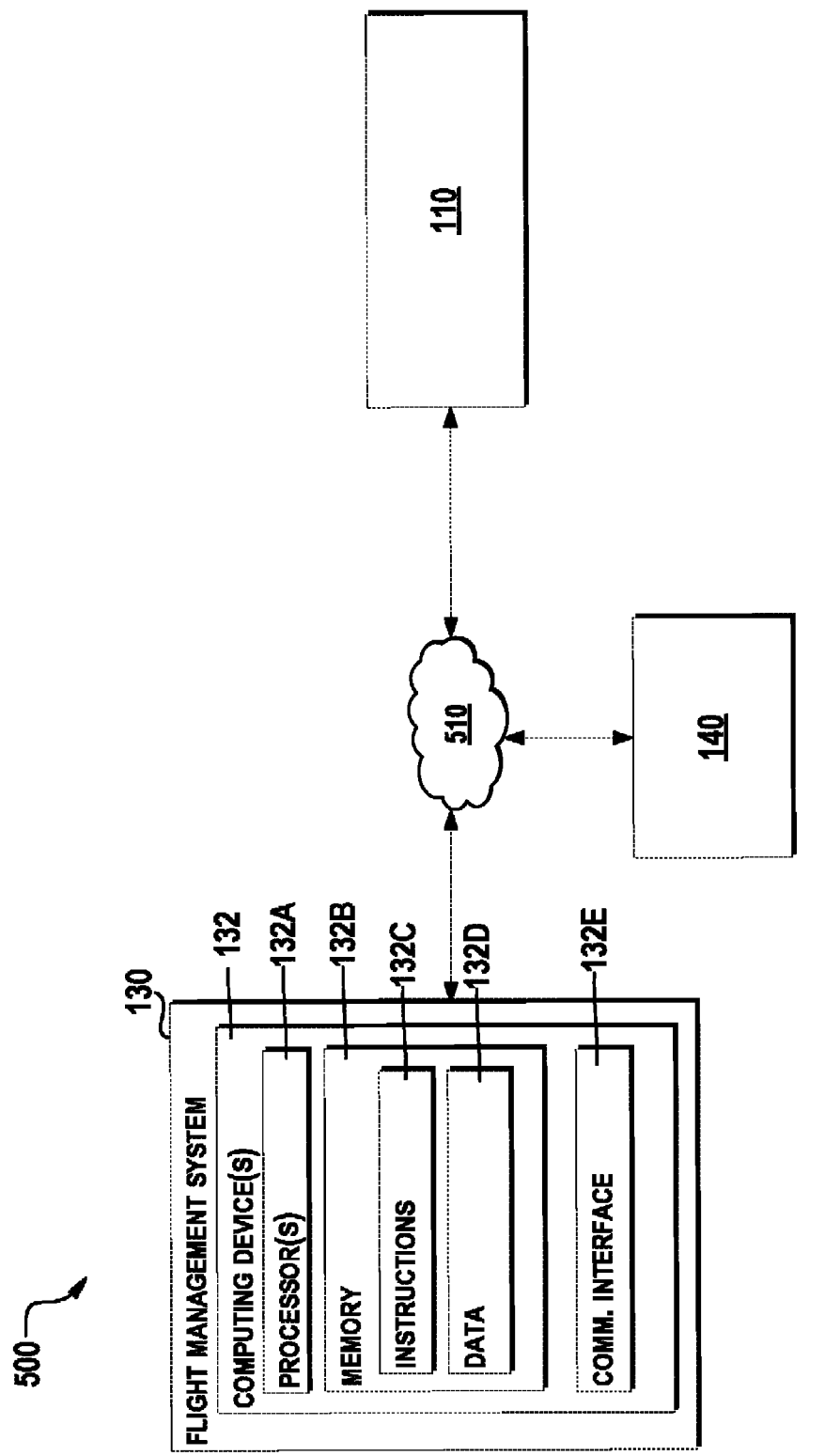
FIG. 5 depicts an example system for predicting aircraft navigation performance according to example embodiments of the present disclosure.

FIG. 5 depicts an example system 500 according to example embodiments of the present disclosure. The system 500 can include the navigation system(s) 110, the flight management system 130, and the onboard system(s) 140. The navigation system(s) 110, the flight management system 130, and/or the onboard system(s) 140 can be configured to communicate via a wired and/or wireless network 510. Network 510 can include any suitable communications network for transmitting signals associated with the aircraft 120.

As shown, the flight management system 130 can include one or more computing device(s) 132. The computing device(s) 132 can include one or more processor(s) 132A and one or more memory device(s) 132B. The one or more processor(s) 132A can include any suitable processing device, such as a microprocessor, microcontroller, integrated circuit, logic device, or other suitable processing device. The one or more memory device(s) 132B can include one or more computer-readable media, including, but not limited to, non-transitory computer-readable media, RAM, ROM, hard drives, flash drives, or other memory devices.

The one or more memory device(s) 132B can store information accessible by the one or more processor(s) 132A, including computer-readable instructions 132C that can be executed by the one or more processor(s) 132A. The instructions 132C can be any set of instructions that when executed by the one or more processor(s) 132A, cause the one or more processor(s) 132A to perform operations. The instructions 132C can be software written in any suitable programming language or can be implemented in hardware. In some embodiments, the instructions 132C can be executed by the one or more processor(s) 132A to cause the one or more processor(s) 132A to perform operations, such as the operations for predicting aircraft navigation performance, as described with reference to FIGS. 1 and 2, and/or any other operations or functions of the one or more computing device(s) 132.

The memory device(s) 132B can further store data 132D that can be accessed by the processors 132A. For example, the data 132D can include a navigational database, data associated with the navigation system(s) 110, data associated with the onboard systems 140, data indicative of a flight plan associated with the aircraft 120, one or more parameter(s) associated with a future point in a flight plan, data associated with the future actual navigation performance, data associated with the future required navigation performance, information indicative of whether the future actual navigation performance satisfies the future required navigation performance, data indicating that the aircraft 120 can complete one or more leg(s) and/or procedure(s) of the flight plan without exceeding the future required navigation performance, and/or any other data associated with aircraft 120, as described herein. The data 132D can include one or more table(s), function(s), algorithm(s), model(s), equation(s), etc. for determining the future actual navigation performance and/or the future required navigation performance. For instance, in one example implementation, the data 132D can include one or more algorithm(s) (e.g., Kalman filter), as described herein.

The computing device(s) 132 can also include a network interface 132E used to communicate, for example, with the other components of system 300. The network interface 132E can include any suitable components for interfacing with one or more network(s), including for example, transmitters, receivers, ports, controllers, antennas, or other suitable components.

The technology discussed herein makes computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of predicting aircraft navigation performance, comprising:

determining, by one or more computing devices included in an aircraft, that one or more navigational aid measurements ore not available to the aircraft;

estimating, by the one or more computing devices, a future actual navigation performance associated with the aircraft for a future point in a flight plan, wherein the future actual navigation performance is based at least in part on data indicative of the flight plan associated with the aircraft and one or more parameters associated with the future point in the flight plan, and includes an estimate of a radial position error;

determining, by the one or more computing devices, a future required navigation performance associated with the future point in the flight plan, wherein the future required navigation performance includes a radial position error limit;

comparing, by the one or more computing devices, the future actual navigation performance to the future required navigation performance to determine if the future actual navigation performance satisfies the future required navigation performance;

providing, by the one or more computing devices to an onboard system of the aircraft, information indicative of whether the future actual navigation performance satisfies the future required navigation performance; and displaying, via the onboard system, an alert based on the information indicative of whether the future actual navigation performance satisfies the future required navigation performance.

2. The computer-implemented method of claim 1, wherein estimating the future actual navigation performance, determining the future required navigation performance, comparing the future actual navigation performance to the future required navigation performance, and providing information to the onboard system of the aircraft are all performed when the one or more navigational aid measurements are not available to the aircraft.

3. The computer-implemented method of claim 1, wherein providing, by the one or more computing devices to the onboard system of the aircraft, information indicative of whether the future actual navigation performance satisfies the future required navigation performance comprises:

providing, by the one or more computing devices to the onboard system of the aircraft, data indicating that the aircraft can complete one or more legs or procedures of the flight plan without exceeding the future required navigation performance.

4. The computer-implemented method of claim 1, wherein providing, by the one or more computing devices to the onboard system of the aircraft, information indicative of whether the future actual navigation performance satisfies the future required navigation performance comprises:

providing, by the one or more computing devices to the onboard system of the aircraft, a set of data associated with the future actual navigation performance.

5. The computer-implemented method of claim 4, wherein the set of data associated with the future actual navigation performance comprises at least one of a message indicating that the future actual navigation performance exceeds the future required navigation performance, an amount of time remaining until the future required navigation performance will be exceeded, a future time at which the future required navigation performance will be exceeded, and the future actual navigation performance at the future time.

6. The computer-implemented method of claim 1, wherein the one or more navigational aid measurements comprise at least one of a measurement associated with a global positioning system, a measurement associated with distance measuring equipment, a measurement associated with a VHF omni-directional range system, or a measurement associated with a localizer system.

7. The computer-implemented method of claim 1, wherein the one or more parameters comprise at least one of an estimated speed associated with the aircraft, an estimated position associated with the aircraft, an estimated velocity associated with the aircraft, or an estimated altitude associated with the aircraft at the future point in the flight plan.

8. The computer-implemented method of claim 1, wherein determining, by the one or more computing devices, the future required navigation performance associated with the future point in the fight plan comprises:

obtaining, by the one or more computing devices, the future required navigation performance from a navigational database.

9. A flight management system for predicting aircraft navigation performance, the system comprising one or more processors and one or more memory devices included with an aircraft, the one or more memory devices storing instructions that when executed by the one or more processors cause the one or more processors to perform operations, the operations comprising:

determining that no navigational aid measurements are available to the aircraft;

when no navigational aid measurements are available to the aircraft;

estimating one or more future actual navigation performances associated with the aircraft, wherein each of the one or more future actual navigation performances is based at least in part on data indicative of a flight plan associated with the aircraft and one or more parameters associated with a respective future point in the flight plan;

determining one or more future required navigation performances for each respective future point in the flight plan, wherein each of the one or more future actual navigation performances comprises an estimate of aircraft radio position error, and wherein each of the one or more future required navigation performances comprises an error limit;

comparing the one or more future actual navigation performances to the one or more future required navigation performances to determine if the future actual navigation performances satisfy the future required navigation performances at the respective future points in the flight plan;

providing, to an onboard system of the aircraft, information indicative of whether one or more of the future actual navigation performances satisfy one or more of the future required navigation performances; and and providing an annunciation based on the information indicative of whether one or more of the future actual navigation performances satisfy one or more of the future required navigation performances, wherein the annunciation is at least one of textual, graphical, audio, or video.

10. The flight management system of claim 9, wherein providing, to the onboard system of the aircraft, information indicative of whether one or more of the future actual navigation performances satisfy one or more of the future required navigation performances comprises:

providing, to an onboard system of the aircraft, data indicating that the aircraft can complete one or more future legs or procedures of the flight plan without exceeding the one or more future required navigation performances, when the one or more future actual navigation performances do not exceed the one or more future required navigation performances at the one or more respective future points in the flight plan.

11. The flight management system of claim 9, wherein providing, to the onboard system of the aircraft, information indicative of whether one or more of the future actual navigation performances satisfy one or more of the future required navigation performances comprises:

providing, to an onboard system of the aircraft, a set of data associated with the one or more future actual navigation performances, when one or more of the future actual navigation performances exceed one or more of the future required navigation performances at the one or more respective future points in the flight plan.

12. The flight management system of claim 11, wherein the set of data associated with the one or more future actual navigation performances comprises at least one of a message indicating that one or more of the future actual navigation performances exceed one or more of the future required navigation performances, an amount of time remaining until one or more of the future required navigation performances will be exceeded, one or more futures time at which one or more of the future required navigation performances will be exceeded, and one or more future actual navigation performances at the one or more future times.

13. The flight management system of claim 9, wherein the one or more navigational aid measurements comprise at least one of a measurement associated with a global positioning system, a measurement associated with distance measuring equipment, a measurement associated with a VHF omni-directional range system, or a measurement associated with a localizer system.

14. The flight management system of claim 9, wherein the one or more parameters comprise at least one of an estimated speed associated with the aircraft, an estimated position associated with the aircraft, an estimated velocity associated with the aircraft, or an estimated altitude associated with the aircraft.

15. An aircraft, comprising:
one or more navigation systems configured to provide one or more navigational aid measurements to the aircraft;
one or more onboard systems configured to provide information to a fight crew member of the aircraft; and
a computing system comprising one or more processors and one or more memory devices located on the aircraft, the one or more memory devices storing instructions that when executed by the one or more processors cause the one or more processors to perform operations comprising:
  determining that the one or more navigational aid measurements are not available to the aircraft;
  estimating a future actual navigation performance associated with the aircraft, wherein the future actual navigation performance is based at least in part on data indicative of a flight plan associated with the aircraft and one or more parameters associated with a future point in the flight plan;
  determining a future required navigation performance associated with the future point in the flight plan, wherein the future actual navigation performance comprises an estimate of an aircraft radial position error, and wherein the future required navigation performance comprises an error limit;
  comparing the future actual navigation performance to the future required navigation performance to determine if the future actual navigation performance satisfies the future required navigation performance;
  providing, to one or more of the onboard systems of the aircraft, data indicating that the aircraft can complete one or more future legs or procedures of the flight plan without exceeding the future required navigation performance when the future actual navigation performance satisfies the future required navigation performance;
  providing, to the onboard systems of the aircraft, a set of data associated with the future actual navigation performance when the future actual navigation performance does not satisfy the future required navigation performance; and
  generating an annunciation, via the onboard systems of the aircraft, based on the set of data.

16. The aircraft of claim 15, wherein the operations are performed without navigational aid measurements.

17. The aircraft of claim 15, wherein the one or more parameters comprise at least one of an estimated speed associated with the aircraft, an estimated position associated with the aircraft, an estimated velocity associated with the aircraft, or an estimated altitude associated with the aircraft at the future point in a flight plan.

18. The aircraft of claim 15, wherein the set of data associated with the future actual navigation performance comprises at least one of a message indicating that the future actual navigation performance exceeds the future required navigation performance, an amount of time remaining until the future required navigation performance will be exceeded, a future time at which the future required navigation performance will be exceeded, and the future actual navigation performance at the future time.

* * * * *